Oct. 30, 1956  H. KLEIN  2,768,922
METHOD OF SECURING RIBBON FILMS TO SLIDE FASTENER TAPES
Filed Jan. 9, 1953
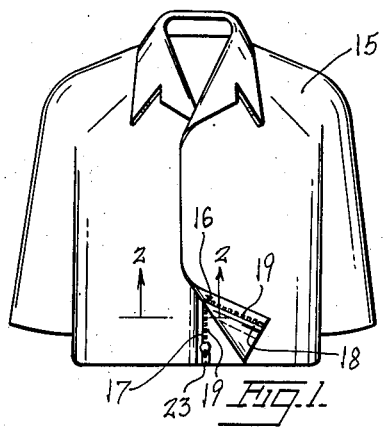
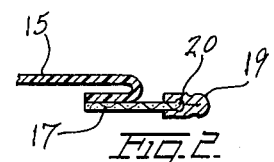
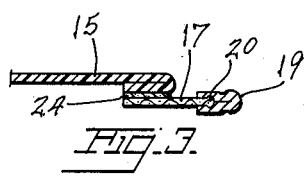
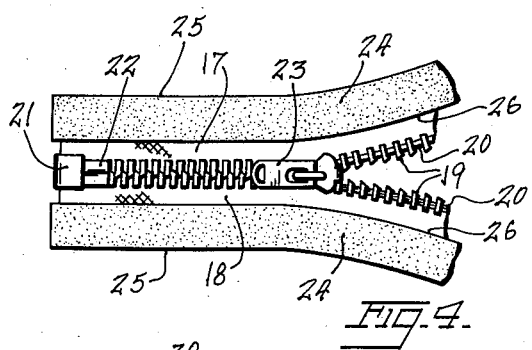
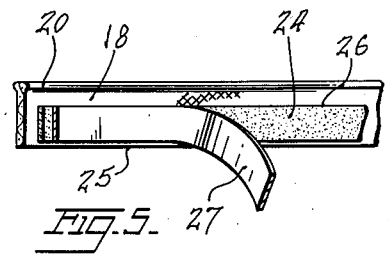
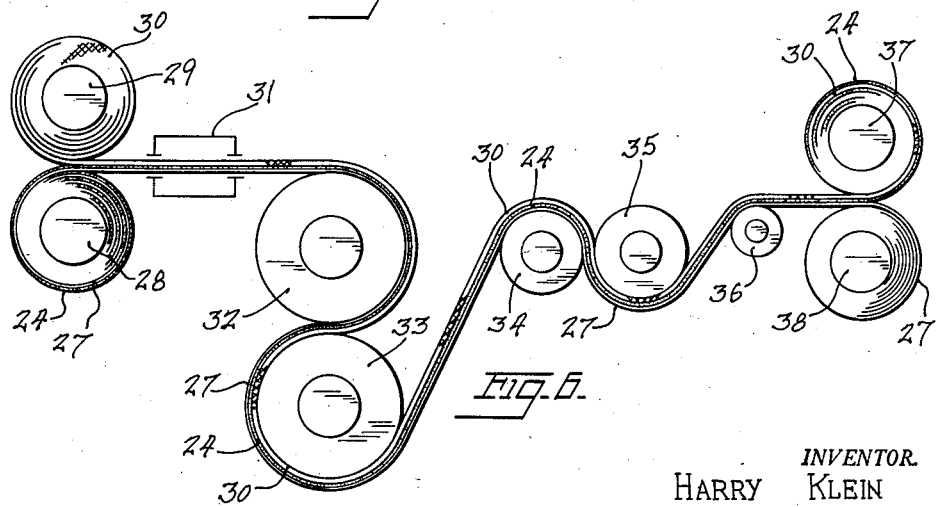
INVENTOR.
HARRY KLEIN
BY
ATTORNEY United States Patent Office 2,768,922
Patented Oct. 30, 1956

2,768,922

METHOD OF SECURING RIBBON FILMS TO SLIDE FASTENER TAPES

Harry Klein, Merrick, N. Y., assignor of one-half to William P. Canepa, Rego Park, N. Y.

Application January 9, 1953, Serial No. 330,505

1 Claim. (Cl. 154—97.5)

This invention relates to slide fastener fabric tapes both for the connected but separable fastener stringer and for detachable fasteners where the two stringers are completely separable.

More particularly, the present invention proposes a new and useful method of making a slide fastener tape which can be heat sealed to a thermoplastic article or textile fabric such as a raincoat, garment bag, beach bag, cosmetic kit, utility bag, pillow case, mattress cover, food covers and any other of the numerous articles made from such material and provided with slide fasteners.

Another object of the present invention proposes a novel method to provide articles made of thermoplastic sheet material with slide fastener closure means without weakening the material or materially adding to the production costs.

Still further, the present invention proposes a method wherein cotton tapes commonly used for slide fasteners may be adapted for sealing to thermoplastic articles or textile fabric by dielectric heating in an electronic sealing machine without impregnating the tapes or interweaving material into them or otherwise affecting the flexible, washable and waterproof character of the tapes, or by a conventional household pressing iron.

As a further object, the present invention proposes a method which may be used to strip surface or cover in a single operation, slide fastener tapes of narrow width with a precisely place controlled width and quantity of resinous film of thermoplastic material.

The present invention further proposes a method of securing a thermoplastic sealing film or coating to a slide fastener tape and the film or coating to a thermoplastic article so that the thermoplastic will not peel off, curl or otherwise separate from the cotton slide fastener tape or permit the tape to shift on the article and make the slide fastener defective or inoperable.

For further comprehension of the invention, and of the objects and advantages thereof, reference will be had to the following description and accompanying drawings, and to the appended claims in which the various novel features of the invention are more particularly set forth.

On the accompanying drawings forming a material part of this disclosure:

Fig. 1 is a pictorial view of a slide fastener secured to a plastic rain jacket or coat.

Fig. 2 is a sectional view taken on line 2—2 of Fig. 1.

Fig. 3 is a view similar to Fig. 2, but showing the parts before being heat sealed together.

Fig. 4 is a fragmentary view of a slide fastener provided with a thermoplastic sealing film on each ribbon tape in accordance with the method of this invention.

Fig. 5 is a fragmentary view of a single cotton ribbon tape before the fastener elements are secured to it, but after the thermoplastic sealing film has been secured to it and with the backing material for the film partially stripped away.

Fig. 6 is a diagrammatic and schematic view illustrating one way in which the method of the present invention may be carried out.

Referring more particularly to the drawing, by way of example, Fig. 1 shows a plastic rain jacket or coat 15 made of thermoplastic material, the fly front of which is closed by a slide fastener 16. The slide fastener 16, consists of two cotton fabric tape stringers 17 and 18, each containing metallic slide fastener elements or scoops 19, the fastener elements each being clamped at one end to one of the tapes on the beaded edge 20 of the tape. The slide fastener 16, also has the usual box 21 and pin coupling 22 and slide 23.

The cotton fabric slide fastener tapes 17 and 18, are connected to the plastic article 15, by the method and in the manner now to be described.

Tapes 17 and 18 each have a ribbon of thermoplastic film 24 adhered thereto, the film being disposed on one side or surface of each tape and spaced from its beaded edge 20, lying alongside of or adjacent to the other edge 25 of the tape. Each tape is made of woven cotton material and is of uniform width with selvage edges. The ribbon film 24 is of relatively narrow width compared to the tape and being disposed adjacent or alongside one selvage edge 25, of the tape, the opposite selvage and beaded edge 20 is spaced from the inner edge 26 of each ribbon film 24.

To produce the ribbon film on the tape, a narrow band 27 (Figs. 5 and 6) of flexible material, preferably of impervious paper, is coated on one face with the continuous film 24 of thermoplastic, such as a thermoplastic vinyl resin. This is one example of a resinous material that is flexible film forming and which can be cast or coated on an impervious paper and which will fuse below a temperature of 300° F. The impervious paper band or strip 27 coated with the ribbon of thermoplastic film 24, is then wound on a roll or spool 28 (Fig. 6), with the film outwardly disposed.

A roll 29, wound with porous woven cotton fabric tape 30, is spaced above the spool 28 so that the tape will overlie the coated paper strip. The film coated paper 27 is fed from the roll 28, together with the tape 30 through a threading aligning and tensioning device 31. This device aligns the ribbon of thermoplastic film 24, coated on the impervious paper strip 27 with the tape 30. The aligned members are in superimposed relation with the film 24 against the tape 30. The tape 30 is of uniform width with selvage edges and the ribbon film 24 and paper strip 27 narrower than the tape. Film 24 and paper strip 27 are aligned with the tape in such a way that the film 24 is disposed against one side of the tape and spaced from one edge 20 of the tape 30.

The aligned and laminated material is then fed between heating roller 32 and pressure roller 33 with the paper strip 27 bearing against heating roller 32 and the tape 30 against pressure roller 33. Heating roller 32 is heated by steam or other means to a temperature sufficient to plasticize the film 24, which is disposed against the tape 30 between the tape and the paper strip, and make the film adhere to the tape. This temperature preferably should be below 400° F. and between 300 and 350° so that common papers may be used for the backing strip and will not burn. The pressure roller 33 should subject the laminations to a pressure of approximately twenty pounds per square inch.

Film 24 is thus adhered and laminated to the cotton tape 30 and the laminated material is then fed through cooling rollers 34 and 35 to solidify the film on the tape.

In this manner, the film 24 is transferred from the paper strip 27 to the tape 30. The heat and pressure cause the film to flow into the interstices of the porous cotton tape but it cannot flow into the impervious paper strip 27. Cooling (by means of rollers 34 and 35)

solidifies the thermoplastic film which then adheres to the tape more than to the paper.

The cooled film and tape together with the paper strip are then passed over tensioning means 36 and the paper strip is stripped from the film 24 and tape 30 by winding the tape on one winding roll 37 and the paper strip 27 on another winding roll 38 (see also Fig. 5).

The beaded edge 20 may be applied to the edge of tape 30 and then the fastener elements or scoops 19 are secured by clamping them to the beaded edge 20, this edge of the tapes not being covered by film. Then the tape 30 may be cut into the desired length for slide fastener tapes 17 and 18 and the box 21, pin coupling 22 and slide 23 added to form the structure illustrated in Fig. 4.

To apply or secure the slide fastener tape to a thermoplastic article, such as coat 15, the film covered portions of the tapes 17 and 18 are placed against the article (see Fig. 3), and the film 24 is heat sealed to the article to secure the slide fastener tape and stringer to it. The film and the thermoplastic material of the article against the film are fused together as shown in Fig. 2. This is most conveniently done by passing the portions of the tapes and the article which are superposed, with the film 24 between, through an electronic dielectric heat sealing machine.

The film 24 and paper strip 27 may be cut from wide pieces such as forty-inch widths. A three-eighths inch wide film has proven economical to use with a one-half inch wide tape.

Examples of material suitable for the thermoplastic film 24 are polyvinyl acetate, properly plasticized with dioctyl phthalate and other thermoplastic resins which will plasticize at temperatures below 300 to 350° F., and which will completely solidify on cooling and not be tacky.

The paper strip 27 preferably is made of an impervious paper which will withstand for a few seconds, without appreciable loss in tensile strength, temperatures of approximately 300 to 400° F. and a pressure of approximately twenty pounds per square inch. Further, thermoplastic film material must be such as not to migrate or adhere to the paper after this heat and pressure is applied to the paper band or strip 27. In addition, after cooling, the paper must be such that it can be stripped from the film without breaking, splitting or delamination.

In the practice of this invention, it has been found that the following papers may be used satisfactorily:

(1) A paper treated with melamine resins and which is then subjected to a super calendered finish.

(2) A supercalendered paper subjected to a treatment of silicone resins.

(3) A heavy weight glassine type paper.

Although the method of the invention has particular application to the manufacture of a slide fastener tape, it may be practiced to produce other tapes which have selvage edges and which cannot therefore be practically and economically coated by conventional means, for example, Venetian blind tapes, ribbons, folded and bias-seam tapes.

It will also be understood that the method of this invention can be used for bonding slide fastener tapes by means of electronic dielectric heat sealing means to materials other than a vinyl film, for example, fabrics, paper and generally surfaces of a porous nature or those which fuse at relatively low temperatures.

It will now be apparent that the method herein described permits a fabricated article having slide fasteners to be entirely electronically sealed thereby entirely eliminating sewing machines with resulting efficiency in production.

It will be further apparent that an article formed from a film of resin and the slide fastener made by the method of the present invention and applied to the article as described has superior qualities of resistance to tensile strain than does a conventional slide fastener applied to such an article by conventional sewing machines.

It will be still further apparent that by using the method of the present invention, there is eliminated a requirement of relatively expensive heavy gauge resinous reinforcements, which reinforcements were heretofore required and used when the slide fastener tape was sewed to the article.

The tape produced by the method of the present invention is waterproof, washable, has a non-tacky surface and remains pliable even though coated.

By the use of the method of the present invention, it will be further apparent that a resinous film of exact quantity and dimension may be transferred and applied in a continuous operation to a tape of specific width having selvage edges, and both sides of the tape can be treated in this manner at one time, if so desired.

It is to be understood that the paper strip 27 and winding roll 38 can be eliminated in the method by providing that the roller 32 be a cold roller over which the tape and thermoplastic film passes, the tape in direct contact with roller 32 and proceeding on to roller 33 which would be a heated roller over which the thermoplastic film and tape passes, the thermoplastic film in direct contact with roller 33. For textile fabrics a conventional household iron could be used by the ultimate consumer in adapting the tape and zipper to garments or other articles requiring slide fastening attachment. This would obviate the use of the present means of attaching same by sewing, etc.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

The method of producing a ribbon film on a stringer tape for slide fasteners consisting of feeding a porous cotton fabric tape and a band of paper of narrower width coated with a ribbon of thermoplastic film through an aligning and tensioning chamber to align the ribbon of plastic film and paper with the tape, along one edge thereof, passing the aligned tape and film coated paper over a heating roller and under a pressure roller to laminate the film and fabric tape together, cooling the laminated material and stripping the paper from the laminated film and tape, to leave the film along one long edge of the tape.

References Cited in the file of this patent

UNITED STATES PATENTS

| 1,883,421 | Stevens | Oct. 18, 1932 |
|---|---|---|
| 2,095,209 | Brownsdon | Oct. 5, 1937 |
| 2,353,717 | Francis et al. | July 18, 1944 |
| 2,368,911 | Andler | Feb. 6, 1945 |
| 2,404,191 | Quayle | July 16, 1946 |
| 2,438,615 | Morin | Mar. 30, 1948 |
| 2,472,156 | Gerber | June 7, 1949 |
| 2,556,078 | Francis | June 5, 1951 |
| 2,562,984 | Image | Aug. 7, 1951 |
| 2,575,251 | Arnold | Nov. 13, 1951 |
| 2,651,092 | Poux | Sept. 8, 1953 |

FOREIGN PATENTS

| 622,996 | Great Britain | May 11, 1949 |